US010459475B2

United States Patent
Gandhi et al.

(10) Patent No.: US 10,459,475 B2
(45) Date of Patent: Oct. 29, 2019

(54) METHOD AND MECHANISMS TO USE PHASE CHANGE MATERIAL TO IMPROVE OCCUPANT COMFORT IN AUTOMOBILES

(71) Applicant: Toyota Motor Engineering & Manufacturing North America, Inc., Erlanger, KY (US)

(72) Inventors: Umesh N. Gandhi, Farmington Hills, MI (US); Brian J. Pinkelman, Ann Arbor, MI (US); Shailesh N. Joshi, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 185 days.

(21) Appl. No.: 15/585,947

(22) Filed: May 3, 2017

(65) Prior Publication Data
US 2018/0321703 A1    Nov. 8, 2018

(51) Int. Cl.
*G05G 1/06*    (2006.01)
*F16H 59/02*    (2006.01)
(Continued)

(52) U.S. Cl.
CPC .............. *G05G 1/06* (2013.01); *B60R 13/00* (2013.01); *F16H 59/0278* (2013.01); *B60R 2013/0287* (2013.01)

(58) Field of Classification Search
CPC .. G05G 1/06; G05G 1/10; B60R 13/08; F16H 59/0278; B62K 21/26; B62D 1/06; B62D 1/065
(Continued)

(56) References Cited

U.S. PATENT DOCUMENTS 4,964,402 A    10/1990   Grim et al.
5,846,629 A *  12/1998   Gwinn .................... B32B 37/00
                                                   428/68
(Continued)

OTHER PUBLICATIONS alibaba.com, "Hangzhou Phase Change Technology Co., Ltd", Retrieved from the Internet: <https://hzfeijie.en.alibaba.com/product/1448845650-220286736/phase_change_material_PCM_balls.html#!>, Retrieved May 2, 2017, 3 pages.

*Primary Examiner* — Thomas C Diaz
(74) *Attorney, Agent, or Firm* — Christopher G. Darow; Darrow Mustafa PC

(57) ABSTRACT

A temperature moderation apparatus is structured to be positioned in vehicle passenger compartment. The apparatus includes an outer shell defining an interior of the shell, the wall has an exterior surface structured and positioned for physical contact with a skin surface of a vehicle occupant. The outer shell wall also has a plurality of through-holes formed therein. A phase change material element is positioned within the shell interior. The phase change material element includes a stretchable, thermally-conductive outer wall and a quantity of phase change material positioned therein. A pressurization mechanism is coupled to the phase change material element, the pressurization mechanism is structured to pressurize the phase change material element so as to force portions of the phase change material element to extend from the interior of the shell into associated ones of the through holes and past the outer shell wall exterior surface.

18 Claims, 7 Drawing Sheets

(51) Int. Cl.
*B60R 13/00* (2006.01)
*B60R 13/02* (2006.01)

(58) Field of Classification Search
USPC ........................................................ 74/551.9
See application file for complete search history.

(56) References Cited

U.S. PATENT DOCUMENTS

| | | | | |
|---|---|---|---|---|
| 6,093,910 | A * | 7/2000 | McClintock | B60N 2/5685 |
| | | | | 165/41 |
| 8,881,347 | B2 * | 11/2014 | Feinstein | B25G 1/01 |
| | | | | 16/430 |
| 9,298,207 | B2 * | 3/2016 | Li | B60K 20/02 |
| 2005/0111177 | A1 * | 5/2005 | Kwitek | G06F 1/1616 |
| | | | | 361/679.19 |

* cited by examiner

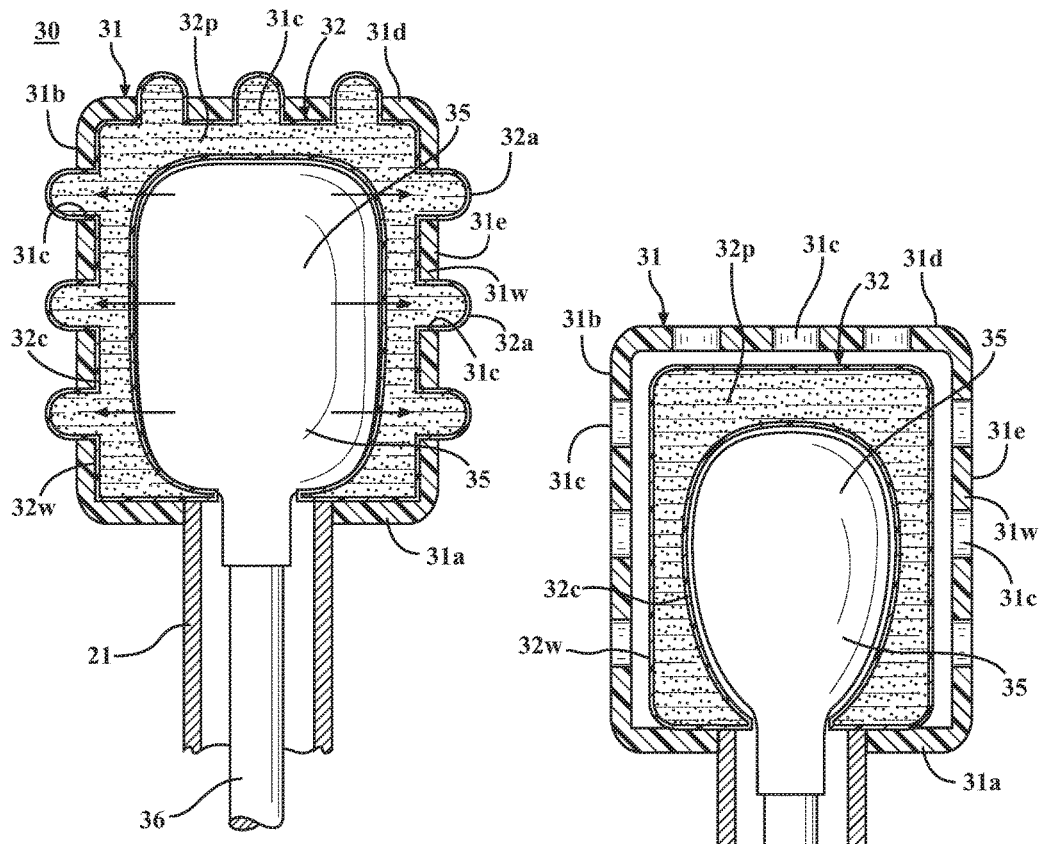
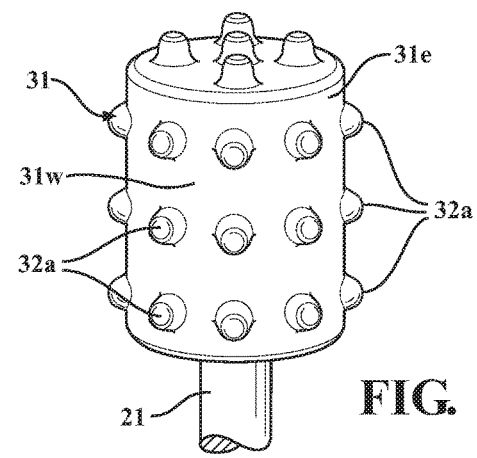
FIG. 1A
FIG. 1B
FIG. 1C

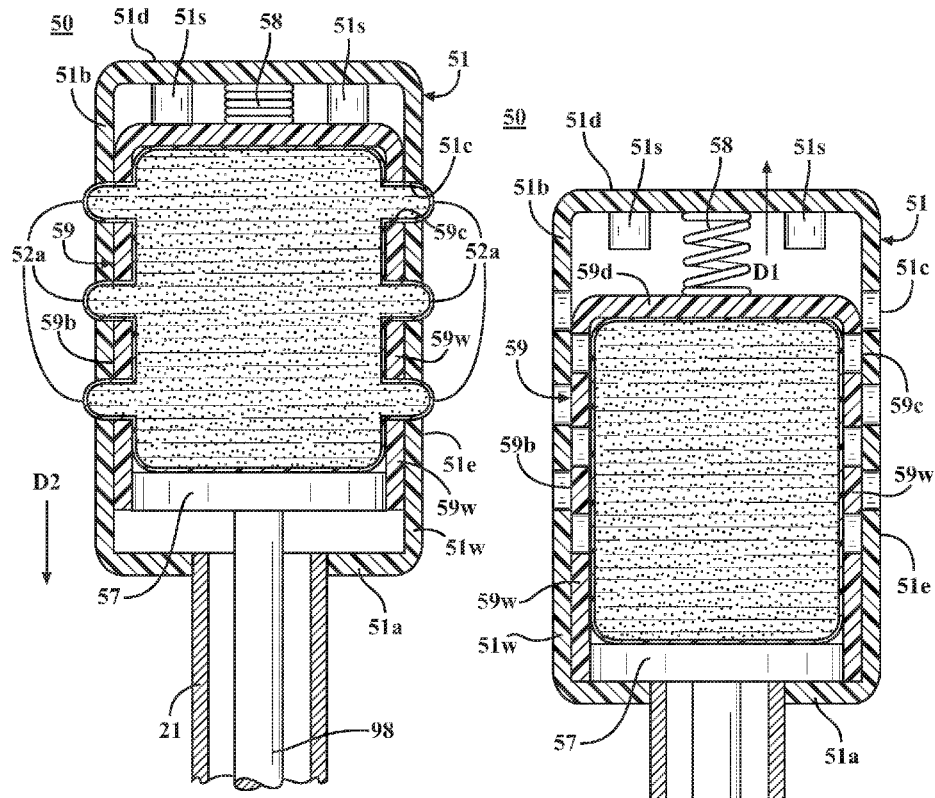
FIG. 2A
FIG. 2B
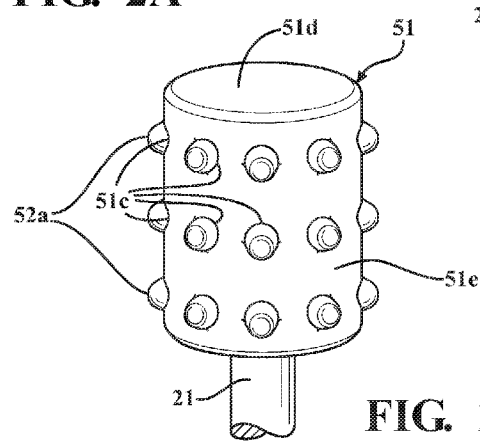
FIG. 2C

METHOD AND MECHANISMS TO USE PHASE CHANGE MATERIAL TO IMPROVE OCCUPANT COMFORT IN AUTOMOBILES

TECHNICAL FIELD

The present invention relates to devices and mechanisms for moderating the temperature of components inside a vehicle passenger compartment which may be touched by a user during operation of the vehicle.

BACKGROUND

Various surfaces within a vehicle passenger compartment may have a high probability of being touched by an occupant during use of the vehicle. These surfaces may also become uncomfortably hot to the touch during hot weather and due to exposure of the vehicle interior to sunlight. The interior surfaces may also become unpleasantly cold to the touch during exposure of the vehicle to cold weather. Traditional approaches (such as the deployment of a sun shade or the application of insulation to portions of the vehicle interior, for example) to temperature moderation of vehicle interior surfaces may be inconvenient for the vehicle occupant, or may be relatively expensive or impractical to implement.

SUMMARY

In one aspect of the embodiments described herein, an apparatus structured to be positioned in vehicle passenger compartment is provided. The apparatus includes an outer shell having a wall defining an interior of the outer shell. The wall has an exterior surface structured and positioned for physical contact with a skin surface of a vehicle occupant. The wall also has a plurality of through-holes formed therein. A phase change material element positioned within the outer shell interior. The phase change material element includes a stretchable, thermally-conductive outer wall and a quantity of phase change material positioned within, and in physical contact with, the outer wall. A pressurization mechanism is operatively coupled to the phase change material element. The pressurization mechanism is structured to pressurize the phase change material element so as to force portions of the phase change material element to extend from the interior of the outer shell into associated ones of the through holes and past the outer shell wall exterior surface.

In another aspect of the embodiments described herein, a vehicle is provided. The vehicle includes an apparatus positioned in a passenger compartment of the vehicle. The apparatus includes an outer shell having a wall defining an interior of the outer shell, and a phase change material element positioned within the outer shell interior. A pressurization mechanism is structured to pressurize the phase change material element. A computing system in the vehicle includes one or more processors for controlling operation of the computing system, and a memory for storing data and program instructions usable by the one or more processors. The one or more processors are configured to execute instructions stored in the memory to, responsive to satisfaction of at least a first pressurization mechanism actuation criterion, automatically operate the a pressurization mechanism to pressurize the phase change material element.

BRIEF DESCRIPTION OF THE DRAWINGS

FIG. 1A is a schematic side cross-sectional view of a gear shift lever mechanism incorporating a temperature moderation mechanism in accordance with an embodiment described herein, with the temperature moderation mechanism in a deployed or activated condition.

FIG. 1B is the side cross-sectional view of FIG. 1A showing the temperature moderation mechanism in a retracted or deactivated condition.

FIG. 1C is a side perspective view of the embodiment shown in FIGS. 1A and 1B, shown in the condition of FIG. 1A.

FIG. 2A is a schematic side cross-sectional view of a gear shift lever mechanism incorporating a temperature moderation mechanism in accordance with another embodiment described herein, with the temperature moderation mechanism in a deployed or activated condition.

FIG. 2B is the side cross-sectional view of FIG. 2A showing the temperature moderation mechanism in a retracted or deactivated condition.

FIG. 2C is a side perspective view of the embodiment shown in FIGS. 2A and 2B, shown in the condition of FIG. 2A.

DETAILED DESCRIPTION

Figure 3A:
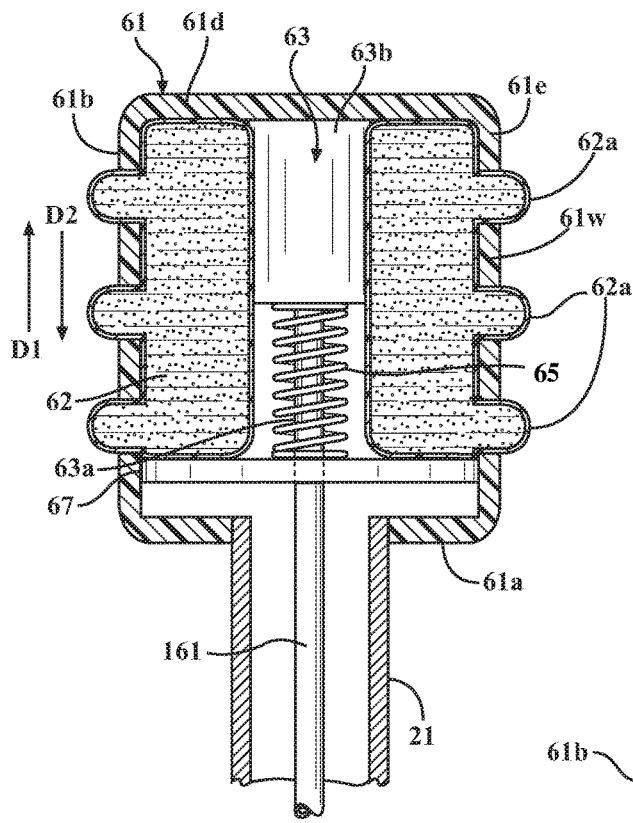
FIG. 3A is a schematic side cross-sectional view of a gear shift lever mechanism incorporating a temperature moderation mechanism in accordance with another embodiment described herein, with the temperature moderation mechanism in a deployed or activated condition.

Embodiments described herein relate to an apparatus structured to be positioned in a vehicle passenger compartment. The apparatus may include an outer shell having a wall defining an interior of the outer shell. The wall may have an exterior surface structured and positioned for physical contact with a skin surface of a vehicle occupant. The outer shell wall also having a plurality of through-holes formed therein. A phase change material element may be positioned within the outer shell interior. The phase change material element may include a stretchable, thermally-conductive outer wall and a quantity of phase change material positioned within, and in physical contact with, the phase change material element outer wall. A pressurization mechanism may be operatively coupled to the phase change material element. The pressurization mechanism may be structured to pressurize the phase change material element so as to force portions of the phase change material element to extend from the interior of the outer shell into associated through holes of the plurality of through holes and past the outer shell wall exterior surface. The temperature range over which the phase change material element varies is markedly less than the temperature range over which vehicle interior surfaces may vary. When the vehicle occupant touches the activated apparatus, the occupant's skin makes contact primarily with the projecting portions of the phase change material element, which may be cooler/warmer than other portions of the vehicle interior. Thus, the apparatus may be used to enhance the comfort of a vehicle occupant by moderating the temperature of a portion of the passenger compartment which is touchable by the occupant.

FIGS. 1-5 show various embodiments of an apparatus structured to be positioned in a vehicle passenger compartment. Embodiments of the apparatus may be used to enhance the comfort of a vehicle occupant by moderating the temperature of a portion of the passenger compartment which is touchable by the occupant. For example, the apparatus embodiments described herein may operate to provide a relatively cooler tactile surface (i.e., a surface structured and positioned for contact with the skin of a vehicle occupant) in situations where the vehicle passenger compartment has been heated by elevated external temperatures and/or long-term exposure to direct sunlight. Alternatively, the apparatus embodiments described herein may operate to provide a relatively warmer tactile surface in situations where the vehicle passenger compartment has been chilled by low external temperatures.

Embodiments of the apparatus described herein may include an outer shell having a wall defining an interior of the outer shell. The wall may have an exterior surface structured and positioned for physical contact with a skin surface of a vehicle occupant. The wall may also have a plurality of through holes formed therein. The outer shell may be formed from a thermally-insulative material, such as a suitable polymer.

A phase change material (PCM) element may be positioned within the outer shell interior. The phase change material element may comprise a suitable phase change material enclosed within a container having a flexible, stretchable, thermally-conductive outer wall. The phase change material may be in physical contact with the outer wall. PCM's are a class of known materials which can store and release energy through phase transition. The energy may be in the form of heat. The phase change materials usable in the vehicle components described herein may utilize a transition between the liquid and solid phases. When the PCM is in a solid phase, it absorbs heat as the external temperature rises. The temperature of the PCM will be the same as the external temperature until the melt point of the PCM is reached. When the external temperature reaches the melt point of the PCM, the PCM will begin to melt, or change phase from a solid to a liquid. During the transition from solid to liquid, the PCM will absorb large amounts of heat with almost no change in temperature. During this phase change period, the PCM may provide a cooling effect. A reverse process may occur as the external temperature drops. Then, a PCM in its liquid phase may release heat as the external temperature decreases and the PCM changes phase from a liquid phase to a solid phase, thereby providing a warming effect.

The PCM may be in a form suitable for use in the applications described herein. For example, a PCM in the form of encapsulated PCM elements suspended in a flowable matrix may be used, to facilitate flow of the PCM within the container and responsive to applied forces. The PCM may be in a form which will flow or displace freely within the container responsive to forces applied to the exterior of the container, and which may transfer forces applied to a portion of the container exterior to other portions of the container exterior. In one or more arrangements, the PCM material is in the form of a colloidal suspension, with solid or encapsulated PCM particles suspended in a suitable liquid matrix. One source of phase change materials in various forms which may be suitable for the applications described herein is Microtek Laboratories, Inc., of Dayton, Ohio. This source offers a variety of PCM's in forms such as liquids, encapsulated elements incorporated into a powder or slurry, and other forms. Phase change materials are also readily available from other sources. Materials usable for the purposes described herein and which may be contained or encapsulated into various shapes may include paraffins (wax), fatty acids (oils), polyglycols, salt hydrates, water solutions, and/or other materials.

The PCM container outer wall may be made as thin as practicable for the mechanical requirements described herein. The outer wall may be formed form a material having a relatively high thermal-conductivity so that heat may be efficiently transmitted to (or from) the PCM in the container. For example, the PCM container may be formed from a silicone or any other material which provides the resiliency, thermal properties, and elasticity needed for the purposes described herein.

A pressurization mechanism may be operatively coupled to the phase change material element and may be structured to pressurize the phase change material element so as to force portions of the phase change material element to extend from the interior of the outer shell through associated ones of the outer shell through holes and past the outer shell wall exterior surface. Thus, for example, a compressive force applied to the PCM container exterior may reduce a first dimension of the container while displacing a portion of the PCM material. At the same time, the displaced PCM material may flow outwardly, in directions orthogonal to the application of the compressive force and/or away from an axis of the applied force. Under application of the compressive force, the stretchable outer wall of the PCM element may expand into areas where expansion of the element is not constrained by structures such as the outer shell and elements of the pressurization mechanism. Thus, the PCM element may stretch into the openings formed in the outer shell when the PCM element is pressurized.

The PCM container, the outer shell, and the pressurization mechanism used to apply pressure to the PCM element may be structured so that portions of the PCM element expand into the outer shell through holes and protrude past the exterior surface of the outer shell when the PCM element is pressurized. Thus, when the PCM element is pressurized, a substantial portion of the area of the exterior surface of the outer shell touched by a vehicle occupant will make contact with the PCM element protrusions rather than the material of the outer shell exterior surface. In this case, the occupant's skin surfaces will be exposed to the temperature of the PCM material through the PCM container outer wall, rather than the temperature of the outer shell. This effect may be used as described herein to provide a vehicle tactile surface that is relatively warm to the touch when the vehicle passenger compartment is cold, and relatively cool to the touch when the vehicle passenger compartment is hot.

The PCM container and PCM embodiments described herein may also be structured such that, when pressure on the PCM element is released, the stretched or protruding portions of the outer wall elastically retract back through the openings, so that the PCM element is once again contained within the outer shell.

FIGS. 1A-1C illustrate one embodiment of an apparatus which has an overall structure as described above, and which operates in the manner described above. FIG. 1A is a schematic cross-sectional side view showing a configuration of the apparatus when the vehicle interior is occupied.

The embodiment shown is incorporated into a gear shift lever mechanism, generally designated 30. The gear shift lever mechanism 30 may have a handle 31 structured and positioned for physical contact with a skin surface of a vehicle occupant. The handle 31 may form an outer shell having a wall 31w defining the interior of the outer shell. The interior is structured for receiving the PCM element 32 therein, as previously described. The wall 31w may include a first end 31a attached to the gear shift lever 21, a second end 31d opposite the first end, and a connecting portion 31b extending between the first and second ends. The connecting portion 31b and the second end 31d may have through holes 31c formed therealong. The outer shell wall 31w may have an exterior surface 31e.

PCM element 32 may be positioned within the outer shell interior. The PCM element may have an outer wall 32w and a quantity of phase change material 32p contained by outer wall 32w. A pressurization mechanism for the embodiment shown may include an inflatable member 35 and any pressurized fluid lines and/or valving 36 connecting the inflatable member 35 to a pressurized fluid source 135 (FIG. 7) for the inflatable member. The PCM element 32 may be structured so as to have a cavity 32c in which the inflatable member 35 may be received. Thus, the PCM element may enclose or surround the inflatable member 35. The inflatable member 35 may be formed from, for example, a rubber or elastic bladder or similar structure. The pressurized fluid line or valving 36 may run through an interior of the gear shift lever 21 back to a pressurized fluid source 135, such as a compressor or pressurizable fluid reservoir or tank. A suitable valving system (not shown) or other mechanism may be controlled manually or automatically to permit inflation fluid to flow to the inflatable member 35.

Generally, when the vehicle is occupied, the pressurization mechanism may be controlled to enable pressurized fluid to flow into inflatable member 35, thereby inflating the inflatable member as shown in FIG. 1A. This inflation applies pressure to the PCM element 32, causing the PCM element 32 to stretch and portions of the PCM element 32 to extend into holes 31c and past the outer shell wall exterior surface 31e as shown in FIG. 1A, thereby forming protrusions 32a. These protrusions 32a serve to expose the PCM element to the exterior temperature of the vehicle passenger compartment, to a greater degree than the PCM element would be exposed if it was still contained within the outer shell. The protrusions enhance heat transfer from the PCM element 32 to the vehicle passenger compartment and from the vehicle passenger compartment to the PCM element. This helps a cold PCM element 32 absorb heat provided by operation of the vehicle heating system when the weather is cold. The apparatus may be controllable so that the PCM element protrusions 32a extend from the outer shell 31 when the vehicle is in use, thereby enabling the protrusions 32a to be touched by a vehicle occupant. In addition, because the protrusions 32a extend past or beyond the outer shell exterior surfaces 31e, the protrusions 32a may effectively displace the exterior surfaces 31e of the outer shell as vehicle occupant tactile surfaces (i.e., contact between the occupant and the outer shell 31 may be mostly or exclusively through the protrusions 32a.

FIG. 1B is the schematic cross-sectional side view of FIG. 1A showing a configuration of the apparatus when the vehicle interior is unoccupied. The apparatus may be controllable so that the protrusions 32a retract inside the outer shell 31 when the vehicle is not in use. When pressure is no longer applied to PCM element 32, the outer wall of the PCM element may elastically retract so that protrusions 32a withdraw back into the interior of outer shell 31. When the protrusions 32a retract inside the outer shell 31, the thermally-insulative outer shell 31 helps the PCM element retain the previously-absorbed heat so that, when the vehicle is subsequently used and the protrusions 32a extended again from the outer shell as shown in FIG. 1A, the retained heat may provide a relatively warmer touch surface for the vehicle occupant. In a similar manner, the protrusions 32a may transfer stored heat to a vehicle interior being cooled by an air conditioning system during vehicle operation on a hot day. This cools the PCM element so that when the vehicle is not in use and the protrusions 32a retract inside the outer shell 31, the thermally-insulative outer shell 31 helps prevent heat transfer from the outer shell exterior to the PCM element. When the vehicle is subsequently used and the protrusions 32a extended from the outer shell as shown in FIG. 1A, the relatively cooler PCM element protrusions 32a may absorb heat from an occupant touching the protrusions, thereby providing touch surfaces that may be relatively cooler than the outer shell which has been heated with the remainder of the vehicle interior. FIG. 1C shows a perspective view of the embodiment shown in FIGS. 1A and 1B, with the protrusions extending through the outer shell wall 31w.

FIGS. 2A and 2B show another embodiment of the apparatus, also in the form of a gear shift lever mechanism, generally designated 50. The gear shift lever mechanism 50 may have a handle 51 structured and positioned for physical contact with a skin surface of a vehicle occupant. The handle 51 may form an outer shell having a wall 51w defining the interior of the outer shell and structured for receiving the PCM element 52 therein. The wall 51w may include a first end 51a attached to the gear shift lever 21, a second end 51d opposite the first end, and a connecting portion 51b extending between the first and second ends. The connecting portion 51b may have through holes 51c formed therealong. The outer shell wall 51w may have an exterior surface 51e.

The mechanism 50 may further include an inner shell 59 positioned in the outer shell interior. The inner shell 59 may be formed from a thermally-insulative material. The inner shell 59 may have a wall 59w defining an interior of the inner shell 59. The inner shell wall 59w may have an end portion 59d and a side portion 59b extending from the end portion. The side portion 59b may include a plurality of through holes 59c formed therein. The inner shell 59 may be slidable along the outer shell wall connecting portion 51b in a first direction D1 with respect to the outer shell 51 so as to bring the inner shell wall through holes 59c into alignment with associated ones of the outer shell wall through holes 51c.

The PCM element 52 may be positioned within the inner shell interior. In this embodiment, the pressurization mechanism may be structured to pressurize the phase change material element 52 so as to force portions of the phase change material element 52 to stretch from the interior of the inner shell 59 into associated ones of the aligned inner shell wall through holes 59c and outer shell wall through holes 51c and past the outer shell wall exterior surface 51e, when the inner shell wall through holes 59c are in alignment with the associated ones of the outer shell wall through holes 51c. More specifically, the pressurization mechanism may include a piston 98 including a pressurization member 57 structured to compress the phase change material element 52 when the piston is actuated. The piston 98 may be part of (or operatively coupled to) an air cylinder (not shown) for example, positioned in or adjacent the gear shift lever 21. Alternatively, another force application mechanism may be coupled to the pressurization member 57 to exert the required force. A spring member 58 may be positioned between the outer shell 51 and the inner shell 59, and may be structured to urge the inner shell wall end portion 59d in a direction D2 away from the outer shell wall second end 51d. The pressurization member 57 may extend inside the inner shell 59 as shown in FIGS. 2A-2B.

When the piston 98 is actuated in direction D1 as shown in FIG. 2A, the pressurization member 57 pushes against the PCM element 52, which pushes against the inner shell 59. This compresses the spring member 58 and forces the inner shell wall end portion 59d toward the outer shell wall second end 51d. The inner shell 59 is moved in direction D1 until the inner shell holes 59c align with the outer shell holes 51c. Hard stops 51s may be provided on the outer shell 51 or the inner shell 59 to prevent further movement of the inner shell 59 in the first direction D1 when the inner shell wall through holes 59c are in alignment with the associated ones of the outer shell wall through holes 51c.

At this point, the pressurization member 57 continues to compress the PCM element 52, causing the PCM element 52 to stretch and portions of the PCM element 52 to extend into and through inner shell holes 59c and outer shell holes 51c, and past the outer shell wall exterior surface 51e as shown in FIG. 2A, thereby forming protrusions 52a. These protrusions 52a serve to expose the PCM element to the exterior temperature of the vehicle interior as previously described. When pressure is no longer applied to PCM element 52, the outer wall of the PCM element elastically retracts so that protrusions 52a withdraw back into the interior of inner shell 59. Also, spring member 58 urges the inner shell 59 into a position where the inner shell holes 59c and the outer shell holes 51c are no longer aligned, and therefore no longer form a passage leading from the interior of the inner shell 59 to the exterior of the outer shell 51. In this configuration, the inner shell 59 forms a thermal barrier between the PCM element and the environment exterior of the outer shell 51, which may enter the outer shell 51 through holes 51c. This aids in thermally isolating the PCM element. The passage leading from the interior of the inner shell 59 to the exterior of the outer shell 51 is thus only opened when the PCM element is pressurized for exposure to the vehicle interior environment.

Figure 3B:
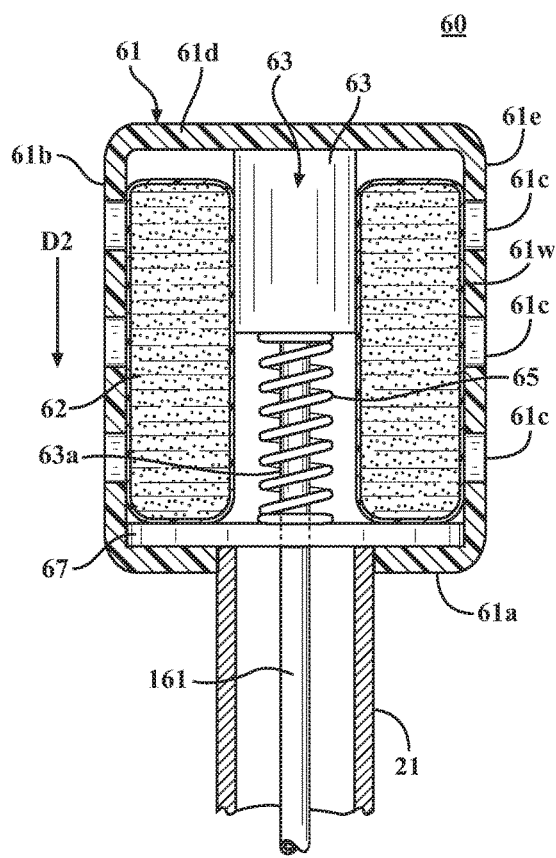
FIG. 3B is the side cross-sectional view of FIG. 3A showing the temperature moderation mechanism in a retracted or deactivated condition.

FIGS. 3A-3B show another embodiment of the apparatus, also in the form of a gear shift lever mechanism, generally designated 60. The gear shift lever mechanism 60 may have a handle 61 structured and positioned for physical contact with a skin surface of a vehicle occupant. The handle 61 may form an outer shell having a wall 61w defining the interior of the outer shell and structured for receiving the PCM element 62 therein. The wall 61w may include a first end 61a attached to the gear shift lever 21, a second end 61d opposite the first end, and a connecting portion 61b extending between the first and second ends. The connecting portion 61b and the second end 61d may have through holes 61c formed therealong. The outer shell wall 61w may have an exterior surface 61e.

A pressurization mechanism for the gear shift lever mechanism 60 may include a solenoid 63 having a body 63b mounted to outer shell wall second end 61d. The PCM element 62 may have an annular shape to permit the solenoid 63 to extend therethrough. A shaft 63a of the solenoid may be attached to a pressurization member 67. A spring member 65 may be positioned between the pressurization member 67 and the body 63b of the solenoid 63. Solenoid 63 may be powered by a conduit or power line 161 extending from an electrical power source 197 (FIG. 9) to the solenoid.

Referring to FIG. 3A, when the solenoid 63 is energized, the shaft 63a is drawn into the body 63b of the solenoid, thereby moving the pressurization member 67 in direction D1 to compress the PCM element 62, and also compressing the spring member 65. Protrusions 62a are formed as previously described and as shown in FIG. 3A.

Referring to FIG. 3B, when the solenoid 63 is de-energized, the pressurization member 67 may travel in direction D2 responsive to force exerted by the spring member 65 and the elasticity of the PCM element 62. Upon relief of the pressure on the PCM element 62, the elasticity of the PCM element outer wall causes the protrusions 62a to retract back through the openings, so that the PCM element is once again contained within the wall 61w.

Figure 4A:
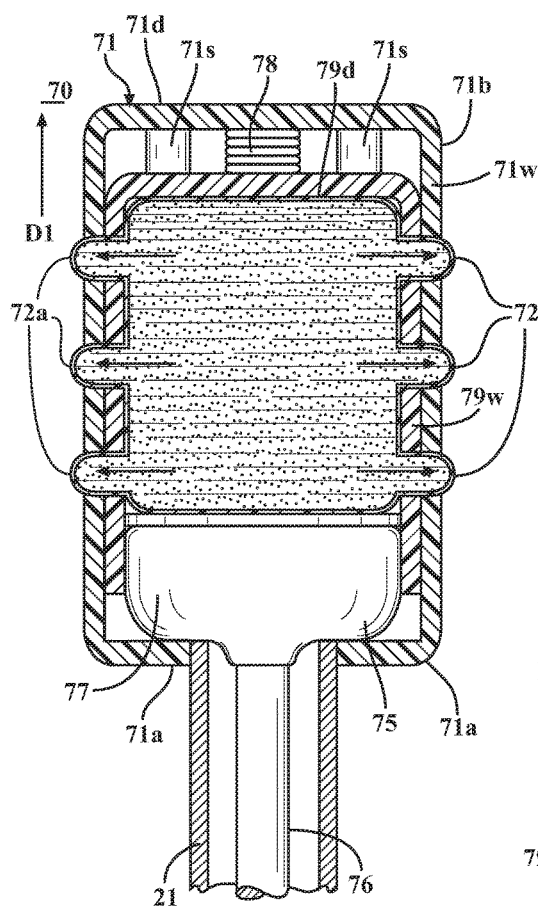
FIG. 4A is a schematic side cross-sectional view of a gear shift lever mechanism incorporating a temperature moderation mechanism in accordance with another embodiment described herein, with the temperature moderation mechanism in a deployed or activated condition.
Figure 4B:
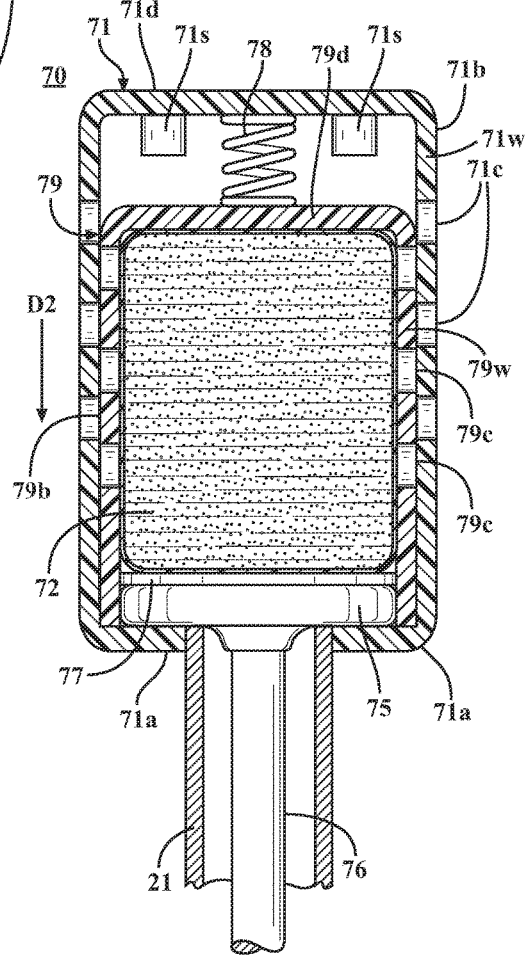
FIG. 4B is the side cross-sectional view of FIG. 4A showing the temperature moderation mechanism in a retracted or deactivated condition.

FIGS. 4A and 4B show another embodiment of the apparatus, also in the form of a gear shift lever mechanism, generally designated 70. The embodiment shown in FIGS. 4A-4B is structured and operable in a manner similar to the embodiment shown in FIGS. 2A-2B. The gear shift lever mechanism 70 may have a handle 71 structured and positioned for physical contact with a skin surface of a vehicle occupant. The handle 71 may form an outer shell having a wall 71w defining the interior of the outer shell and structured for receiving the PCM element 72 therein. The wall 71w may include a first end 71a attached to the gear shift lever 21, a second end 71d opposite the first end, and a connecting portion 71b extending between the first and second ends. The connecting portion 71b may have through holes 71c formed therealong. The outer shell wall 71w may have an exterior surface 71e.

The mechanism 70 may include an inner shell 79 positioned in the outer shell interior. The inner shell 79 may be formed from a thermally-insulative material. The inner shell 79 may have a wall 79w defining an interior of the inner shell 79. The inner shell wall may have an end portion 79d and a side portion 79b extending from the end portion. The side portion 79b may include a plurality of through holes 79c formed therein. The inner shell 79 may be slidable along the outer shell wall connecting portion 71b in a first direction D1 with respect to the outer shell 71 so as to bring the inner shell wall through holes 79c into alignment with associated ones of the outer shell wall through holes 71c, as previously described.

The mechanism 70 may also include one or more hard stops 71s and a spring member 78 as previously described. Spring member 78 connects outer shell 71 and inner shell 79. The PCM element 52 is positioned within the inner shell interior as previously described. In this embodiment, pressurization of the PCM element 72 may be achieved by inflation of an inflatable member 75 coupled to a pressurized fluid line 76, as described with respect to FIGS. 1A-1B.

Operation of the mechanism 70 is similar to operation of the embodiment shown in FIGS. 2A-2B. That is, upon inflation, the inflatable member 75 presses against pressurization member 77, which presses against PCM element 72, which pushes the inner shell 79 in direction D1. This compresses the spring member 78 and forces the inner shell wall end portion 79d toward the outer shell wall second end 71d. The inner shell 79 is moved in direction D1 until the inner shell holes 79c align with the outer shell holes 71c. Hard stops 71s may be provided on the outer shell 71 or the inner shell 79 to prevent further movement of the inner shell 79 in the first direction D1 when the inner shell wall through holes 79c are in alignment with the associated ones of the outer shell wall through holes 71c.

At this point, the pressurization member 77 continues to compress the PCM element 72, causing the element 72 to stretch and portions of the PCM element 72 to extend into and through inner shell holes 79c and outer shell holes 71c, and past the outer shell wall exterior surface 71e as shown in FIG. 4A, thereby forming protrusions 72a. These protrusions 72a serve to expose the PCM element to the exterior temperature of the vehicle interior as previously described.

When pressure is no longer applied to PCM element 72, the outer wall of the PCM element elastically retracts so that protrusions 72a withdraw back into the interior of inner shell 79. Also, spring member 78 urges the inner shell 79 into a position where the inner shell holes 79c and the outer shell holes 71c are no longer aligned, and therefore no longer form a passage leading from the interior of the inner shell 79 to the exterior of the outer shell 71. In this configuration, the inner shell 79 forms a thermal barrier between the PCM element and the environment exterior of the outer shell 71, which may enter the outer shell 71 through holes 71c. This aids in thermally isolating the PCM element. The passage leading from the interior of the inner shell 79 to the exterior of the outer shell 71 is thus only opened when the PCM element is pressurized for exposure to the vehicle interior environment.

Figure 5A:
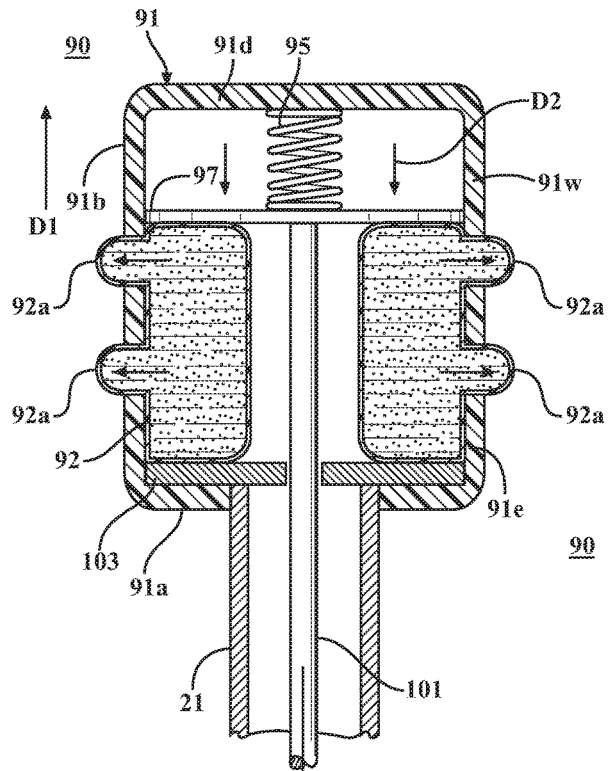
FIG. 5A is a schematic side cross-sectional view of a gear shift lever mechanism incorporating a temperature moderation mechanism in accordance with another embodiment described herein, with the temperature moderation mechanism in a deployed or activated condition.
Figure 5B:
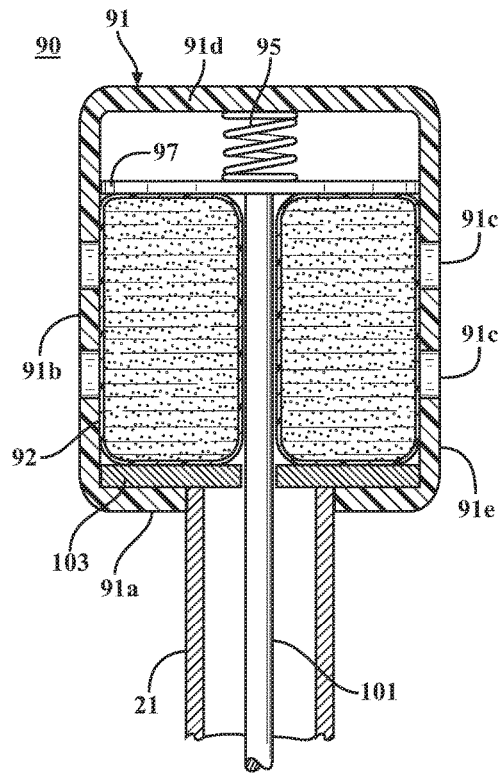
FIG. 5B is the side cross-sectional view of FIG. 5A showing the temperature moderation mechanism in a retracted or deactivated condition.

FIGS. 5A-5B show another embodiment of the apparatus, also in the form of a gear shift lever mechanism, generally designated 90. The gear shift lever mechanism 90 may have a handle 91 structured and positioned for physical contact with a skin surface of a vehicle occupant. The handle 91 may form an outer shell having a wall 91w defining the interior of the outer shell and structured for receiving the PCM element 92 therein. The wall 91w may include a first end 91a attached to the gear shift lever 21, a second end 91d opposite the first end, and a connecting portion 91b extending between the first and second ends. The connecting portion 91b may have through holes 91c formed therealong. The outer shell wall 91w may have an exterior surface 91e.

A pressurization mechanism for the gear shift lever mechanism 90 may include a pressurization member 97 and a base 103. The PCM element 92 may be positioned between the pressurization member 97 and the base 103. A spring member 95 may connect pressurization member 97 to outer shell wall second end 91d. A wire 101 formed from a shape memory alloy (SMA) may extend through the gear shift lever for attachment to the pressurization member 97. The PCM element 92 may have an annular shape so as to provide a passage for the SMA wire 101 to extend through the PCM element 92.

The SMA material of the wire 101 may exhibit known properties of shape memory materials, including thermal shape memory and superelasticity. As is known in the pertinent art, thermal shape memory is a phenomenon whereby an element formed from a shape memory material tends to return from a stretched condition to an original, unstretched condition when the element is heated to a temperature of at least a transformation temperature of the shape memory material. Superelasticity is a phenomenon whereby an element formed from a shape memory material exhibits enhanced elastic properties when the element is heated to a temperature above the transformation temperature of the shape memory material, and also within a superelastic temperature range of the material. The SMA materials usable in the wire 101 may include, without limitation, copper-zinc-aluminum-nickel alloys, copper-aluminum-nickel alloys, and nickel-titanium alloys. However, it will be understood that other SMA materials may be used for the wire, including those known presently in the art and those yet to be developed. In one embodiment, a tether may comprise an alloy of nickel-titanium, such as Nitinol.

In one or more arrangements, the SMA wire 101 may be configured to contract or shorten when heated. This may pull the pressurization member 97 in the direction D2, forcing the attached the pressurization member 97 to compress the PCM element 92 as shown, thereby forming protrusions 92a which extend through outer shell openings 91c in the manner previously described. The SMA material may be heated to a temperature above the transformation temperature of the material and also above the superelastic temperature range of the material to produce the desired contraction.

The SMA wire material may also exhibit superelastic behavior. The wire may be structured to permit superelastic stretching or expansion of the wire responsive to forces exerted by spring member 95 and the elasticity of the PCM element container, which may tend to force the pressurization member 97 in direction D1. This allows the protrusions 92a to withdraw out of openings 91c and back into the interior of the outer shell 91 when the compressive forces are no longer applied by the pressurization member 97. This enables the protruding portions of the PCM element to retract into the outer shell 91 when the wire 101 is heated to a temperature above the transformation temperature of the shape memory material and also within the superelastic temperature range of the material.

In addition, the wire 101 may be structured to still be able to shorten from a stretched length as previously described when subsequently heated to a temperature above the transformation temperature of the shape memory material and also above the superelastic temperature range of the material. Thus, in the manner just described, appropriate heating of the SMA wire 101 enables pressurization and depressurization of the PCM element 92 as desired. The SMA wire 101 may extend through the gear shift lever 21 to a current source 125 (FIG. 10) configured to supply a current to the SMA wire 101.

Figure 6:
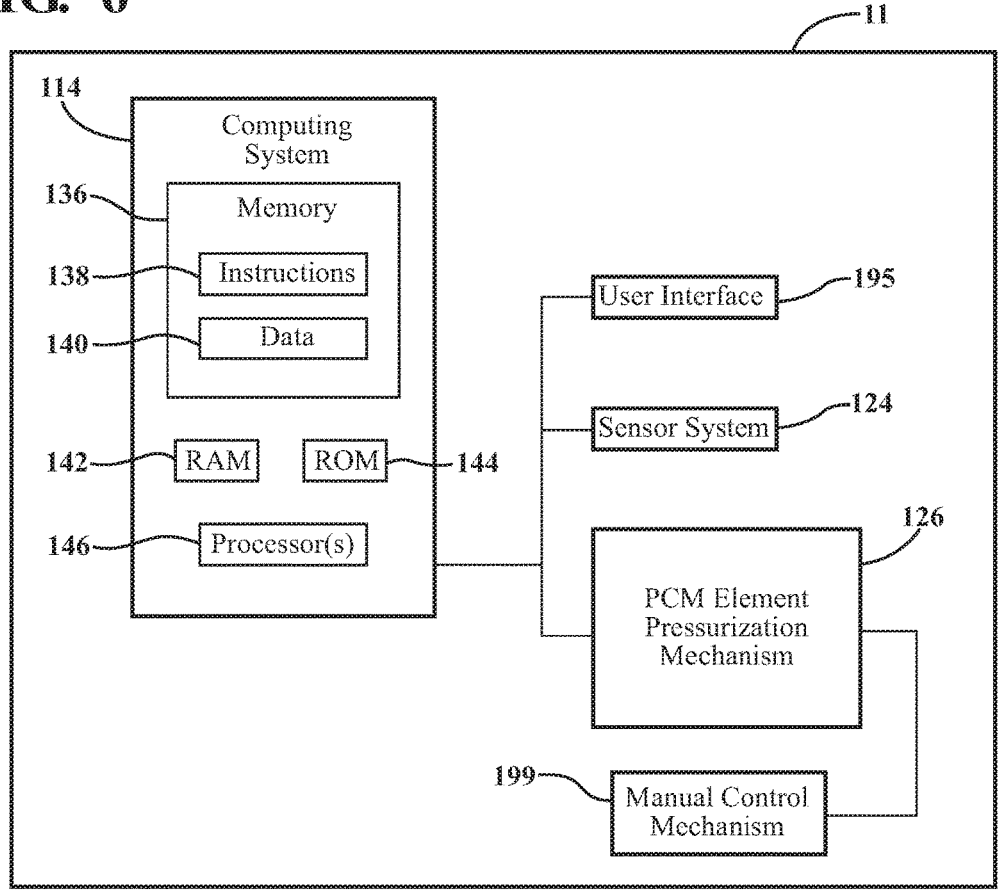
FIG. 6 is a functional block diagram illustrating an exemplary vehicle incorporating a temperature moderation apparatus in accordance with an embodiment described herein.

FIG. 6 is a functional block diagram illustrating an exemplary vehicle 11 incorporating a temperature moderation apparatus in accordance with an embodiment described herein. The vehicle 11 may take the form of a car, truck, or other vehicle. The vehicle 11 may be configured to operate fully or partially in an autonomous mode. In an autonomous mode, the vehicle 11 may be configured to operate without human interaction. Thus, operation of the various PCM element pressurization mechanism embodiments described herein may be controlled automatically in accordance with predetermined criteria. For example, any of the pressurization mechanisms described herein may be automatically operable to pressurize the PCM element to form protrusions extending from the outer shell as described herein, responsive to the start of the vehicle engine, detection of an occupant in a driver or other seat of the vehicle, detection of operation of the vehicle heating system (to heat the vehicle interior) or air conditioning system (to cool the vehicle interior), or any other actuation criterion or criteria. Similarly, any of the pressurization mechanisms described herein may be automatically operable to depressurize the PCM element to retract or withdraw the protrusions extending from the outer shell as described herein, responsive to the stopping of the vehicle engine, detection of that an occupant is leaving the driver's seat, detection that operation of the vehicle heating system or air conditioning system has been stopped, or any other actuation criterion or criteria.

Any of the pressurization mechanisms described herein may also be automatically operable to depressurize the PCM element responsive to the vehicle engine being shut off or the satisfaction of any other depressurization criterion or criteria, thereby causing the PCM protrusions to withdraw back into the outer shell as described herein. Alternatively or in addition to automated operation, any of the pressurization mechanisms described herein may be operable manually to pressurize or depressurize the PCM element, for example, by a vehicle occupant pushing a button or operating another suitable control.

The vehicle 11 may include various systems, subsystems and components in operative communication with each other, such as a sensor system or array 124, a computing system 114, a PCM element pressurization mechanism (generally designated 126) and other systems and components needed for operating the vehicle as described herein. The vehicle 11 may include more or fewer systems and each system could include multiple elements. Thus, additional functional and physical components may be added to the example illustrated by FIG. 6. Further, each of the systems and elements of vehicle 11 could be interconnected. Thus, one or more of the described functions of the vehicle 11 may be divided up into additional functional or physical components or combined into fewer functional or physical components. PCM element pressurization mechanism 126 in FIG. 6 may be embodied in any of the particular pressurization mechanisms 126a-126e shown in FIGS. 7-11, or the PCM element pressurization mechanism 126 in FIG. 6 may be embodied in any other particular pressurization mechanism design not shown in the drawings.

The computing system 114 may be operatively connected to the other vehicle systems and elements and may be configured so as to control and operate the vehicle 11 and its components as described herein. The computing system 114 may be configured to control at least some systems and/or components autonomously (without user input) and/or semi-autonomously (with some degree of user input). The computing system may also be configured to control and/or execute certain functions autonomously and/or semi-autonomously. The computing system 114 may additionally or alternatively include components other than those shown and described. The computing system 114 may control the functioning of the vehicle 11 based on inputs and/or information received from various sensors of the sensor system 124, and also based on other information.

FIG. 6 illustrates a block diagram of an exemplary computing system 114 according to one or more illustrative embodiments of the disclosure. The computing system 114 may have some or all of the elements shown in FIG. 1. In addition, the computing system 114 may also include additional components as needed or desired for particular applications. The computing system 114 may also represent or be embodied in a plurality of controllers or computing devices that may process information and/or serve to control individual components or systems of the vehicle 11 in a distributed fashion.

The computing system 114 may include one or more processors 146 (which could include at least one microprocessor) for controlling overall operation of the computing system 114 and associated components, and which execute instructions stored in a non-transitory computer readable medium, such as the memory 136. "Processor" means any component or group of components that are configured to execute any of the processes and/or process steps described herein or any form of instructions to carry out such processes/process steps or cause such processes/process steps to be performed. The processor(s) 146 may be implemented with one or more general-purpose and/or one or more special-purpose processors. The processor(s) 146 can include at least one hardware circuit (e.g., an integrated circuit) configured to carry out instructions contained in program code. In arrangements in which there is a plurality of processors 146, such processors can work independently from each other or one or more processors can work in combination with each other. In one or more arrangements, the processor(s) 146 can be a main processor of the vehicle 11. For instance, the processor(s) 146 can be part of an electronic control unit (ECU) for the vehicle 11.

In some embodiments, the computing system 114 may include RAM 142, ROM 144, and/or any other suitable form of computer-readable memory. The memory 136 may comprise one or more computer-readable memories. A computer-readable storage or memory 136 includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. The memory 136 can be a component of the computing system 114, or the memory can be operatively connected to the computing system 114 for use thereby. The term "operatively connected," as used throughout this description, can include direct or indirect connections, including connections without direct physical contact.

The memory 136 may contain data 140 and/or instructions 138 (e.g., program logic) executable by the processor(s) 146 to execute various functions of the vehicle 11, as described herein. The memory 136 may contain additional instructions as well, including instructions to transmit data to, receive data from, interact with, or control one or more of the vehicle systems and/or components described herein (for example, an embodiment of a PCM element pressurization system incorporated into the vehicle as described herein).

Vehicle sensor system 124 may be operatively connected with computing system 114 and other vehicle systems and components. In a known manner, the sensor system 124 may include sensors configured to provide data usable by the computing system 114 in formulating and executing suitable control commands for the various vehicle systems. In arrangements in which the sensor system 124 includes a plurality of sensors, the sensors can work independently from each other. Alternatively, two or more of the sensors can work in combination with each other. Sensor system 124 may include, for example, sensors configured to detect the presence of a vehicle occupant in the driver's seat and/or in another vehicle seat, the entry or exit of an occupant from the driver's seat, and/or the occurrence of any other desired PCM pressurization mechanism actuation criteria.

Responsive to the occurrence of one or more PCM pressurization mechanism actuation criteria, the computing system 114 may operate an associated pressurization mechanism to pressurize or depressurize the PCM element in accordance with one of the embodiments described herein.

FIGS. 7-11 show schematic views of particular embodiments 126*a*-126*e* of the pressurization mechanism 126 shown in FIG. 6, and as previously described with respect to FIGS. 1-5. If desired, a user may enable concurrent automated control and manual control of the pressurization mechanism. This enables the user to actuate the pressurization mechanism manually in cases where it may not otherwise be actuated, and may also provide for automated operation of the mechanism in cases where operation of the mechanism is desirable, but where a user may forget to operate the system manually. In a particular embodiment, a user may select from a menu (provided using a suitable user interface 195, for example) the conditions under which the pressurization mechanism will be operated automatically. Alternatively, the user may select to operate the pressurization mechanism in manual mode only, or to deactivate the pressurization mechanism altogether.

Figure 7:
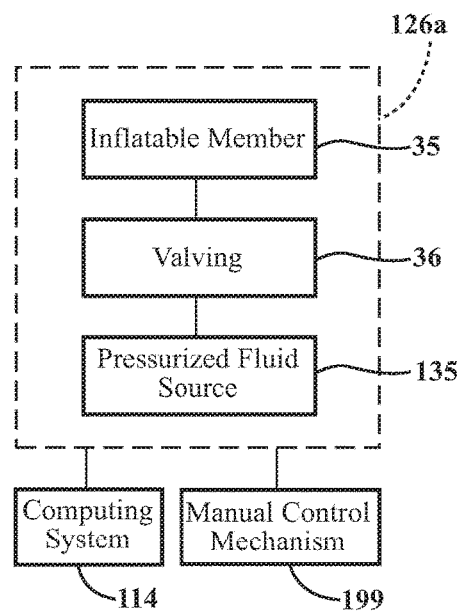
FIG. 7 is a block schematic diagram of one embodiment of a pressurization mechanism usable for the apparatus shown in FIGS. 1A-1C.

Referring to FIG. 7, for example, in the gear shift lever mechanism embodiment shown in FIGS. 1A-1C, the pressurization mechanism 126*a* may include pressurized fluid source 135, inflatable member 35, and pressurized fluid line or valving 36 connecting the pressurized fluid source 135 to the inflatable member 35 to supply inflation fluid to the inflatable member 35. The pressurized fluid source 135, the valving 36 and/or other elements of the mechanism may be operatively connected to the computing system 114 and/or the manual control mechanism 199 to enable computer (i.e., automated) and/or manual control of the pressurization mechanism.

Figure 8:
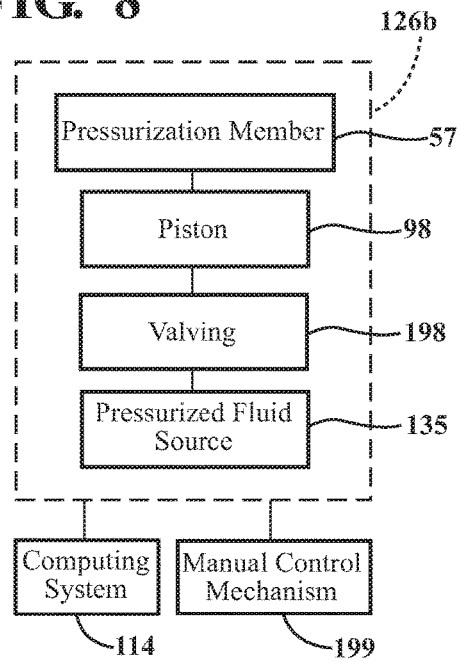
FIG. 8 is a block schematic diagram of one embodiment of a pressurization mechanism usable for the apparatus shown in FIGS. 2A-2C.

Referring to FIG. 8, in the gear shift lever mechanism embodiment shown in FIGS. 2A-2C, the pressurization mechanism 126*b* may include a pressurized fluid source 135, piston 98 operatively connected to the fluid source to power the piston, pressurization member 57, and pressurized fluid line or valving 198 connecting the pressurized fluid source 135 to the piston 98 to supply pressurized fluid to the piston 98. The pressurized fluid source 135, the valving 198 and/or other elements of the mechanism may be operatively connected to the computing system 114 and/or the manual control mechanism 199 to enable computer and/or manual control of the pressurization mechanism.

Figure 9:
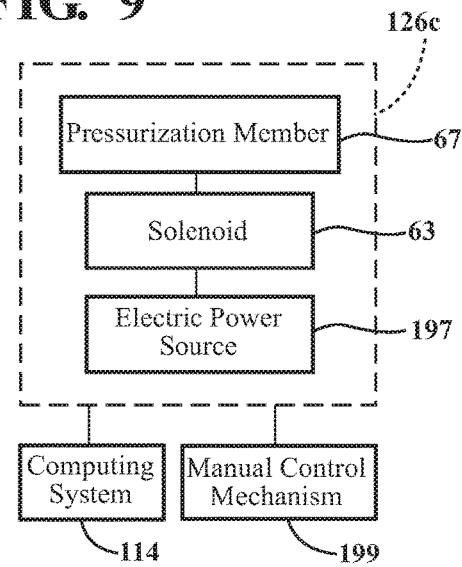
FIG. 9 is a block schematic diagram of one embodiment of a pressurization mechanism usable for the apparatus shown in FIGS. 3A-3B.

Referring to FIG. 9, in the gear shift lever mechanism embodiment shown in FIGS. 3A-3B, the pressurization mechanism may include an electrical power source 197 for the solenoid 63, the solenoid 63, and the pressurization member 67 operatively connected to the solenoid 63 for pressurizing the PCM element 62 upon activation of the solenoid. The electrical power source 197, the solenoid 63, and/or other elements of the mechanism may be operatively connected to the computing system 114 and/or the manual control mechanism 199 to enable computer and/or manual control of the pressurization mechanism.

Figure 10:
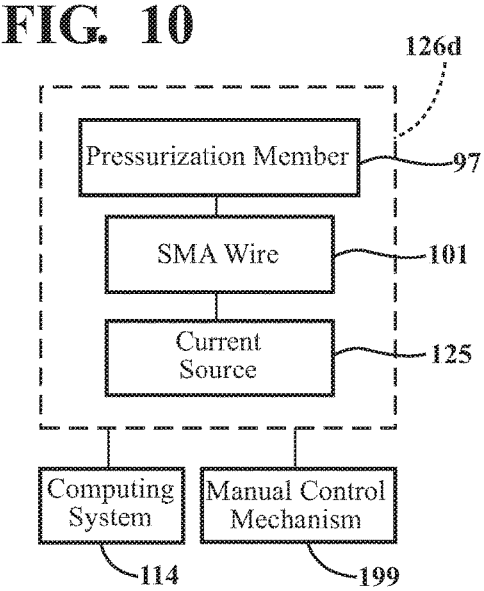
FIG. 10 is a block schematic diagram of one embodiment of a pressurization mechanism usable for the apparatus shown in FIGS. 5A-5B.

Referring to FIG. 10, in the gear shift lever mechanism embodiment shown in FIGS. 5A-5B, the pressurization mechanism may include a current source 125 for the SMA wire, the SMA wire 101, and a pressurization member 67 attached to the SMA wire. Current source 125 may be configured to provide current to the SMA wire 101 for heating the wire as described herein, to cause the wire to contract or to allow the wire to expand superelastically. The current source 125 and/or other elements of the mechanism may be operatively connected to the computing system 114 and/or the manual control mechanism 199 to enable computer and/or manual control of the pressurization mechanism.

Figure 11:
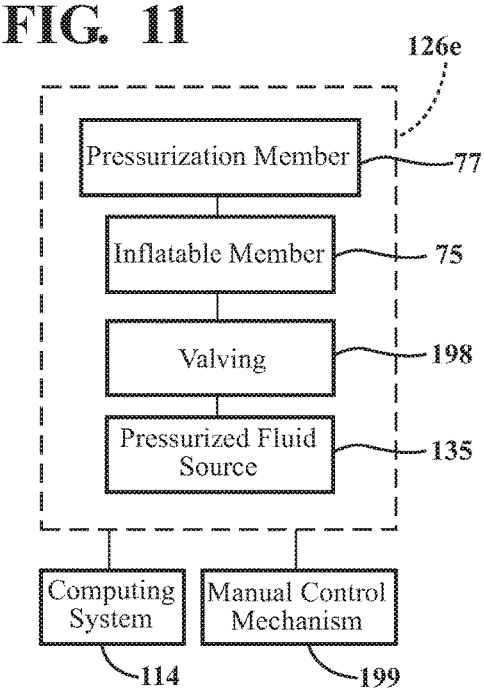
FIG. 11 is a block schematic diagram of one embodiment of a pressurization mechanism usable for the apparatus shown in FIGS. 4A-4B.

Referring to FIG. 11, in the gear shift lever mechanism embodiment shown in FIGS. 4A-4B, the pressurization mechanism 126*e* may include pressurized fluid source 135, inflatable member 75, a pressurization member 77 positioned between the inflatable member 75 and the PCM element 72, and pressurized fluid line or valving 198 connecting the pressurized fluid source 135 to the inflatable member 75 to supply inflation fluid to the inflatable member 75. The pressurized fluid source 135, the valving 198 and/or other elements of the mechanism may be operatively connected to the computing system 114 and/or the manual control mechanism 199 to enable computer (i.e., automated) and/or manual control of the pressurization mechanism.

In the preceding detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. An apparatus structured to be positioned in vehicle passenger compartment, the apparatus comprising:
    an outer shell having a wall defining an interior of the outer shell, the outer shell wall having an exterior surface structured and positioned for physical contact with a skin surface of a vehicle occupant, the outer shell wall also having a plurality of through-holes formed therein;
    a phase change material element positioned within the outer shell interior, the phase change material element including a stretchable, thermally-conductive outer wall and a quantity of phase change material positioned within, and in physical contact with, the phase change material element outer wall; and
    a pressurization mechanism operatively coupled to the phase change material element, the pressurization mechanism being structured to pressurize the phase change material element so as to force portions of the phase change material element to extend from the interior of the outer shell into associated through holes of the plurality of through holes and past the outer shell wall exterior surface.

2. The apparatus of claim 1 wherein the outer shell is formed from a thermally-insulative material.

3. The apparatus of claim 1 wherein the apparatus comprises a gear shift lever.

4. The apparatus of claim 1 wherein the phase change material element is structured such that portions of the phase change material element extending past the outer shell wall exterior surface withdraw back into the outer shell interior when the phase change material element is not pressurized.

5. The apparatus of claim 1 wherein the pressurization mechanism comprises a pressurization member and an inflatable member structured and positioned to force the pressurization member to compress the phase change material element when the inflatable member is inflated.

6. The apparatus of claim 5 wherein the phase change material element has a cavity formed therein, the cavity being structured to receive the inflatable member therein.

7. The apparatus of claim 1 wherein the phase change material element has an annular shape.

8. The apparatus of claim 1 further comprising an inner shell positioned in the outer shell interior, the inner shell having a wall defining an interior of the inner shell, the inner shell wall having plurality of through-holes formed therein, the inner shell being movable in a first direction with respect to the outer shell so as to bring the inner shell wall through-holes into alignment with associated ones of the outer shell wall through-holes, wherein the phase change material element is positioned within the inner shell interior, wherein the pressurization mechanism is structured to pressurize the phase change material element so as to force portions of the phase change material element to stretch from the interior of the inner shell into associated ones of aligned inner shell wall through-holes and outer shell wall through-holes and past the outer shell wall exterior surface, when the inner shell wall through holes are in alignment with associated ones of the outer shell wall through holes.

9. The apparatus of claim 8 further comprising a spring member structured to urge the inner shell in a second direction opposite the first direction when the phase change material element is not pressurized by the pressurization mechanism.

10. The apparatus of claim 8 wherein the phase change material element is structured such that the portions of the phase change material element extending past the outer shell wall exterior surface withdraw back into the inner shell interior when the phase change material element is not pressurized.

11. The apparatus of claim 8 further comprising a hard stop positioned so as to prevent further movement of the inner shell in the first direction when the inner shell wall through holes are in alignment with the associated ones of the outer shell wall through holes.

12. The apparatus of claim 11 wherein the pressurization mechanism comprises a pressurization member and an inflatable member structured to be inflatable to move the pressurization member in the first direction, wherein movement of the pressurization member in the first direction is structured to cause movement of the phase change material element in the first direction, wherein movement of the phase change material element in the first direction is structured to cause movement of the inner shell in the first direction until the hard stop prevents further movement of the inner shell in the first direction, and wherein the inflatable member is structured to further inflate after the hard stop prevents further movement of the inner shell in the first direction, so as to continue to move the pressurization member in the first direction so as to force portions of the phase change material element to stretch from the interior of the inner shell into aligned inner shell wall through-holes and outer shell wall through-holes and past the outer shell wall exterior surface.

13. The apparatus of claim 8 wherein the pressurization mechanism comprises a pressurization member and a piston operatively coupled to the pressurization member so as to force the pressurization member to compress the phase change material element when the piston is actuated.

14. The apparatus of claim 8 wherein the inner shell is formed from a thermally-insulative material.

15. The apparatus of claim 1 wherein the pressurization mechanism comprises a pressurization member and a shape memory material element operatively coupled to the pressurization member so as to force the pressurization member to compress the phase change material element when the shape memory material element is heated to a temperature above a transformation temperature of the shape memory material element and also above a superelastic temperature range of the shape memory material element.

16. The apparatus of claim 1 wherein the pressurization mechanism comprises a pressurization member and a solenoid operatively coupled to the pressurization member so as to force the pressurization member to compress the phase change material element when the solenoid is energized.

17. A vehicle comprising:
an apparatus positioned in a passenger compartment of the vehicle, the apparatus including an outer shell having a wall defining an interior of the outer shell, the outer shell wall having an exterior surface, the outer shell wall also having a plurality of through-holes formed therein,
the apparatus also including a phase change material element positioned within the outer shell interior, and a pressurization mechanism structured to pressurize the phase change material element so as to force portions of the phase change material element to extend from the interior of the outer shell into associated through holes of the plurality of through holes and past the outer shell wall exterior surface; and
a computing system including one or more processors for controlling operation of the computing system, and a memory for storing data and program instructions usable by the one or more processors, wherein the one or more processors are configured to execute instructions stored in the memory to, responsive to satisfaction of at least a first pressurization mechanism actuation criterion, automatically operate the a pressurization mechanism to pressurize the phase change material element.

18. The vehicle of claim 17 wherein the one or more processors are configured to execute instructions stored in the memory to, responsive to satisfaction of at least a second pressurization mechanism actuation criterion, automatically operate the pressurization mechanism to depressurize the phase change material element.

* * * * *